Figure 1:
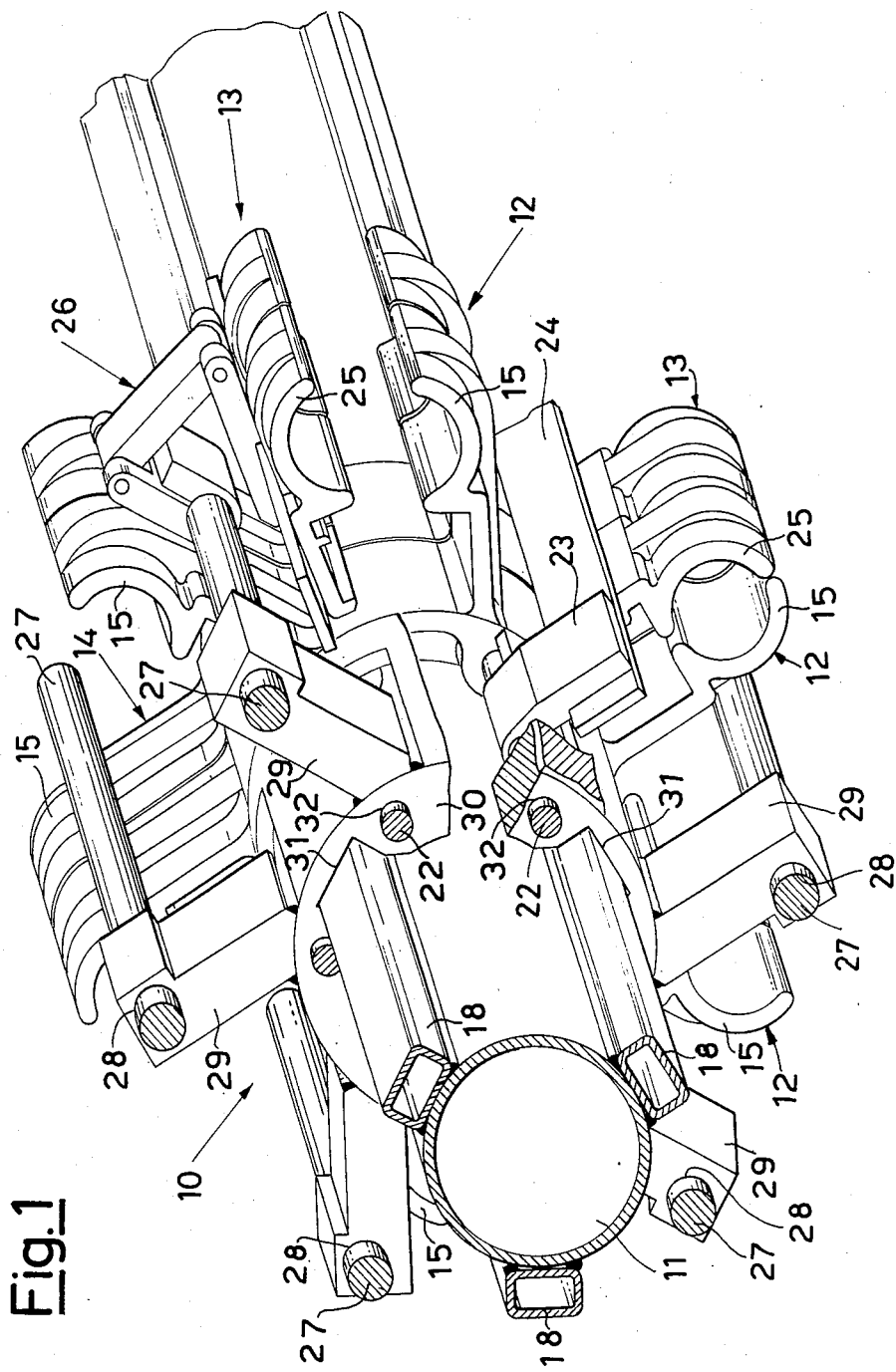

United States Patent [19]

Cucchi et al.

[11] Patent Number: 4,664,002

[45] Date of Patent: May 12, 1987

[54] BAR FEEDER FOR MACHINE TOOLS

[75] Inventors: Giovanni Cucchi; Pietro Cucchi, both of Bussero, Italy

[73] Assignee: Pietro Cucchi & C. S.r.L., Milan, Italy

[21] Appl. No.: 814,251

[22] Filed: Dec. 30, 1985

[30] Foreign Application Priority Data

Jan. 21, 1985 [IT] Italy .............................. 19166 A/85

[51] Int. Cl.⁴ ............................................. B23B 13/04
[52] U.S. Cl. ......................................... 82/2.7; 414/14
[58] Field of Search .............................. 82/2.5, 2.7, 3; 414/14–18

[56] References Cited

U.S. PATENT DOCUMENTS

| | | | |
|---|---|---|---|
| 3,757,927 | 9/1973 | Gable et al. | 82/2.7 |
| 3,874,519 | 4/1975 | Mikami | 82/2.7 |
| 4,292,864 | 10/1981 | Cucchi et al. | 82/2.7 |

FOREIGN PATENT DOCUMENTS

| | | | |
|---|---|---|---|
| 145668 | 6/1985 | European Pat. Off. | 82/2.7 |
| 2102312 | 2/1983 | United Kingdom | 82/2.7 |

Primary Examiner—Kuang Y. Lin
Assistant Examiner—Jerry Kearns
Attorney, Agent, or Firm—Shlesinger Fitzsimmons Shlesinger

[57] ABSTRACT

An apparatus for feeding bars to a machine tool, in particular a multispindle lathe, comprising a plurality of pairs of opposed arrays of respectively stationary and movable jaws extending radially from a rotary drum, wherein the movable array of each pair can be distanced from the opposed, stationary array through the intermediary of a control system.

The stationary arrays are formed of side-by-side sets of jaws extending radially in one piece from respective central hubs fitted onto the drum and there locked against rotation, whereas the movable arrays are secured to radial tongues swing-mounted on axles carried by the stationary arrays. The control system for the movable arrays is, on the contrary, carried by sets of radial tongues extending from respective central hubs which are also fitted and locked to the drum between the sets of jaws.

4 Claims, 7 Drawing Figures

BAR FEEDER FOR MACHINE TOOLS

The present invention relates to an improved apparatus for feeding bars to a machine tools, in particular a multispindle lathe.

Apparatus of this kind are known in which each bar is fed to the lathe through the intermediary of a plurality of pairs of arrays of jaws, which pairs are opposed and aligned in succession and form a runway for the bar. The said jaws extend radially from a drum which can be controlled to rotate stepwise so as to ensure continuous and automatic feeding to the machine tool when the working of each bar has been terminated.

In order to load the bars into the feeding apparatus in a radial direction, the said jaws comprise an array fixed to the drum in a stationary manner, while the opposed array can be distanced from the fixed array so as to form an aperture for radial placement of the bar.

To this end, each movable array of jaws is provided with its own control system.

An apparatus of the kind briefly described above forms subject matter of Italian patent application No. 21988 A/83 filed on July 8, 1983, and published Jan. 8, 1986. The relevant technology may be understood from such application.

Although the apparatus in question operate more than satisfactorily, they are somewhat heavy and costly because the stresses and strains occurring in them make it necessary to secure the arrays of stationary and movable jaws, and the control systems for the latter, to longitudinal girders which are in turn secured to the rotary drum.

The object of the present invention is, therefore, to embody an apparatus in which the overall construction of the stationary and movable jaws is such as to permit these, and their relative control devices, to be mounted in an extremely straightforward and economical manner compared to what occurs in the known art, at the same time providing a highly dependable functional system which requires only a small financial outlay for maintenance and part-replacement.

To attain this object, the invention according to the present application embodies an apparatus for feeding bars to a machine tool, in particular a multispindle lathe, which comprises a plurality of pairs of opposed arrays of jaws, stationary and movable respectively, which extend radially from a rotary drum and in which the movable array of each pair can be distanced from the other, stationary array through a control system, wherein the stationary arrays are formed of side-by-side sets of jaws extending radially in a single piece from the respective central hubs fitted onto said drum and there locked against rotation, and wherein the movable arrays are fixed to radial tongues extending from respective central hubs which are also fitted and locked onto said drum between said sets of jaws.

The structural and functional characteristics of the present invention and its advantages over the known art will become more apparent from the following illustrative description, referred to the appended drawings, of one form of embodiment thereof based on the principles of the invention.

Figure 2:
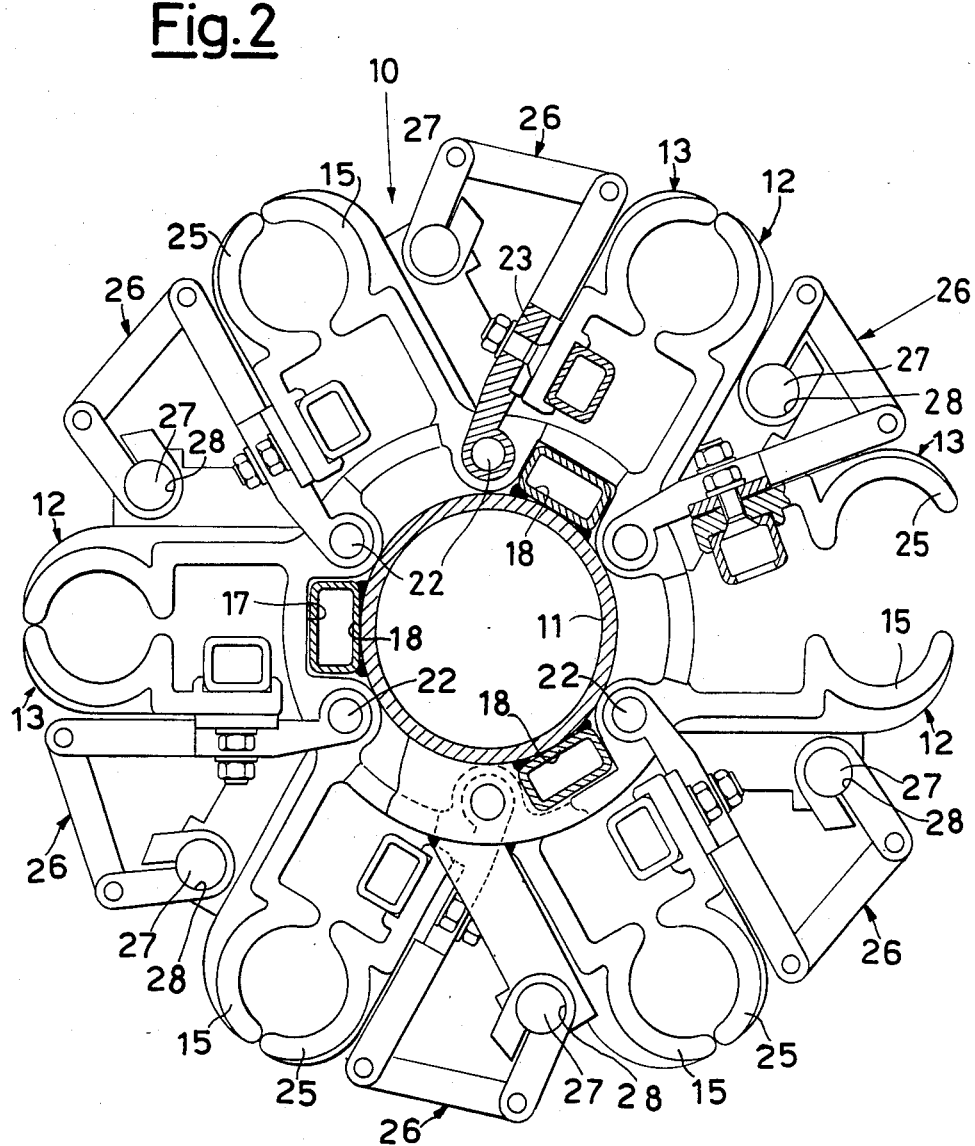
Figure 3:
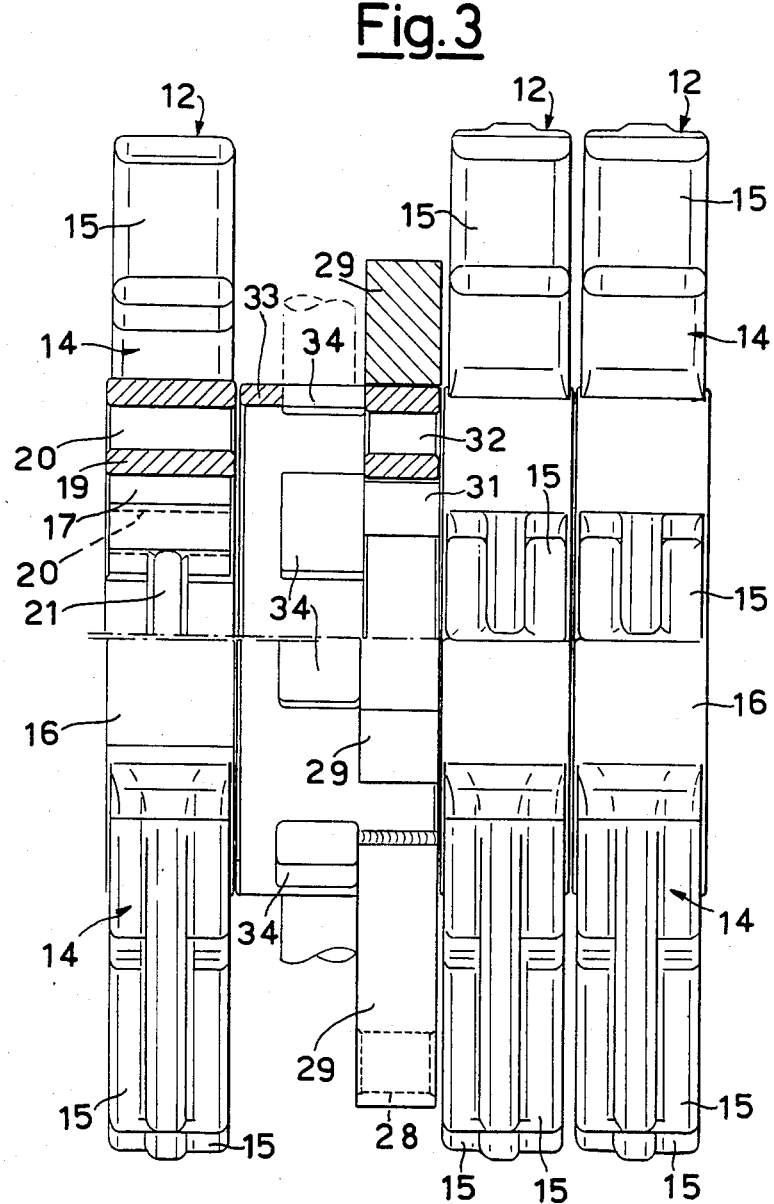
Figure 4:
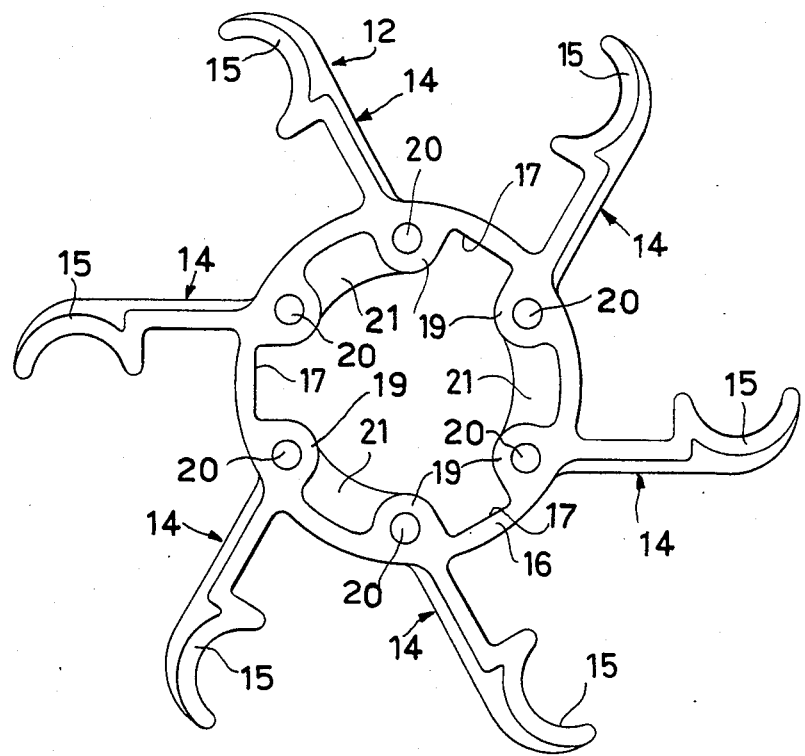
Figure 5:
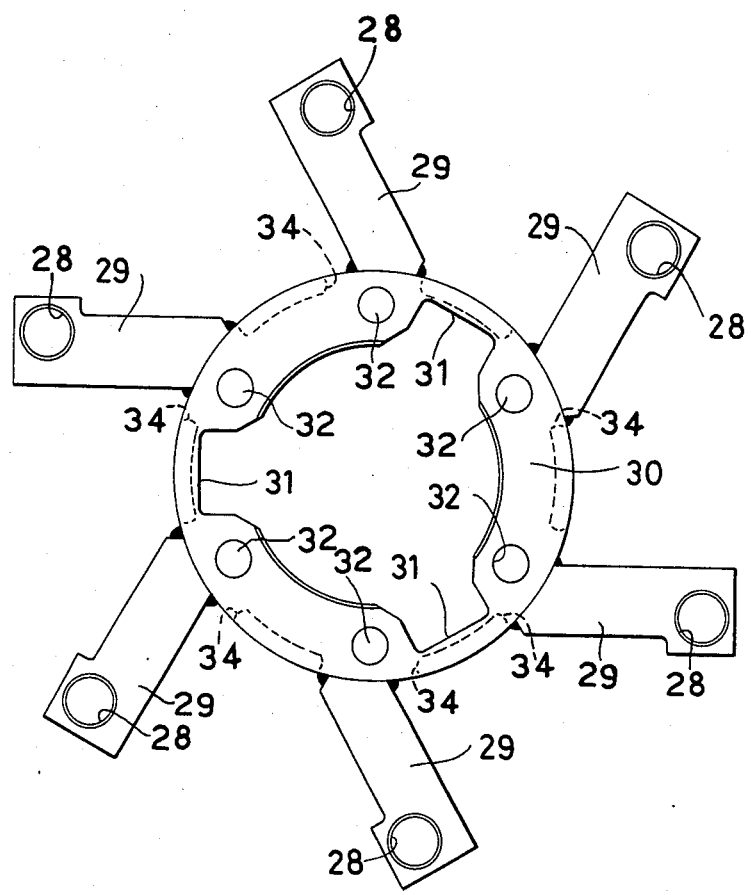
Figure 6:
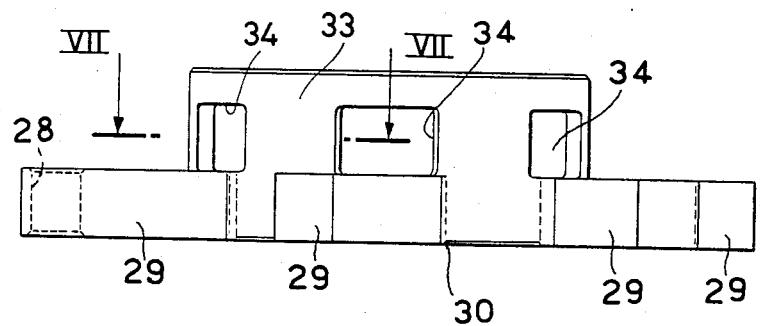
Figure 7:
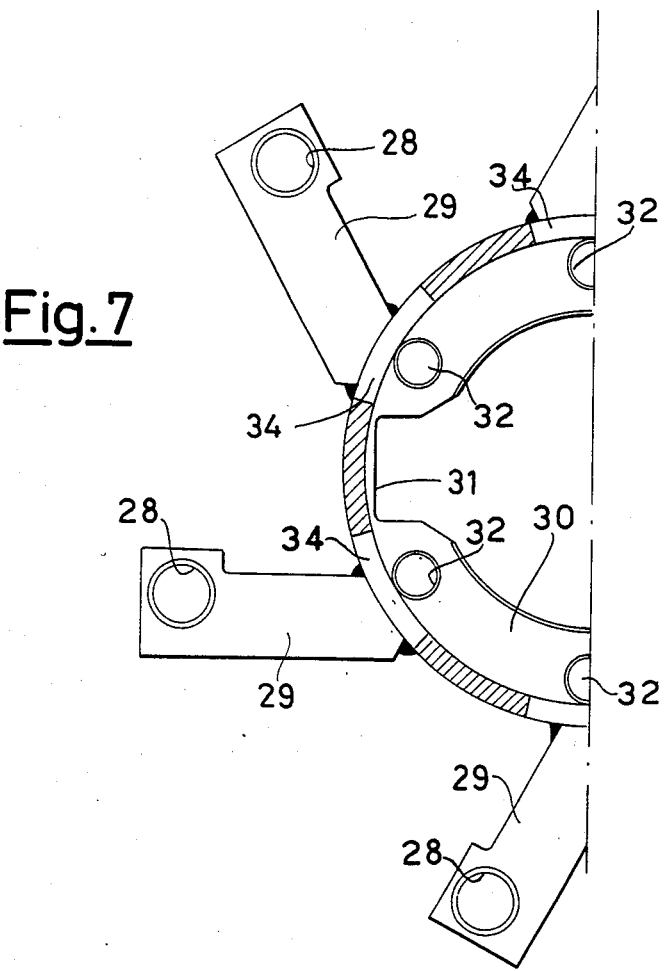

In the drawings:

FIG. 1 is a partial perspective view of the apparatus;
FIG. 2 is a cross-sectional view;
FIG. 3 is a partially sectioned side elevational view;
FIG. 4 is a particular illustrating one of the sets of jaws intended to form the arrays of stationary jaws;
FIG. 5 is a particular illustrating one of the groups of radial tongues intended to support the control systems for the arrays of movable jaws;
FIG. 6 is a view taken on the arrow in FIG. 5; and
FIG. 7 is a sectional particular taken on the line VII—VII in FIG. 6.

With reference to the drawings, the apparatus according to the invention is indicated overall by the reference numeral 10, and consists structurally of a stepwise rotatable drum 11 which carries radially a plurality of pairs of opposed arrays of jaws 12, 13, stationary and movable respectively (FIGS. 1 & 2).

According to the invention, the stationary arrays 12 are formed of side-by-side sets 14 of jaws 15. Each set 14 (FIG. 4) is formed in a single piece of plastics material possessing suitable mechanical properties, in particular a resin with adequate stress and friction resistance, comprising a central hub 16 from which the jaws 15 extend. The hub 16 characteristically features in its interior a plurality of interspaced radial slots 17 which stably lock the set onto the drum 11: the sets 14 are fitted onto the drum 11 with the slots 17 engaging profiles 18 secured to the drum. There is thus provided a stable key-type coupling between the parts. The hub 16 also characteristically features, proximally to the inner or fixed ends of the jaws 15, projections 19 each traversed by a through-bore 20, the function of which is explained hereinafter; the projections 19 are, moreover, interconnected in alternate pairs by reinforcement ribbings 21.

As is clearly shown in FIGS. 1 and 2 of the drawings, the through-bores 20 of the sets 14 of jaws 15 are traversed by shafts 22 to which are pivoted radial tongues 23 carrying respective rods 24 to which the arrays 13 of movable jaws 25 opposed to the jaws 15 are fixed.

According to the invention, linkages 26 which actuate the movable jaws 25 are carried by respective control shafts 27 mounted within bores 28 of sets of radial tongues 29 extending from respective central hubs 30 (FIGS. 1, 2, 5 and 7) which are fitted and locked onto the drum 11, interposed in a suitable number between the sets 14 of movable jaws 15.

To such end, the hub 30 has a structure in part equivalent to that of the hub 16, with slots 31 for coupling to the profiles 18 and with bores 32 for the passage of the shafts 22.

Additionally, each hub 30 features a crown 33 with apertures 34 through which emerge the tongues 23 carrying the arrays 13 of movable jaws 25.

The resulting apparatus for feeding bars to a machine tool, in particular a multispindle lathe, fully attains the object mentioned in the preamble hereto.

For it is evident that the apparatus described above with reference to the appended drawings is from the standpoints of construction and mounting far more straightforward—and thus more economical—than all the known apparatus intended for the same purpose. It is in effect vastly advantageous to be able to embody each sub-set of stationary jaws in a single piece of plastics material which is also able to carry the movable jaws and the mounting of which is by simple fitting onto the drum. In this way, the lengthy and costly operations of welding each single jaw to an intermediate support girder are eliminated.

What is claimed is:

1. An apparatus for feeding bars to a machine tool, in particular a multispindle lathe, comprising a rotary drum, a plurality of pairs of opposed arrays of respectively stationary and movable jaws extending radially from said rotary drum, the movable array of each pair being mounted for movement toward and away from the opposed, stationary array of jaws through the intermediary of a control system, said stationary arrays being formed of side-by-side sets of jaws, each of said sets comprising a first member having a central hub section removably fitted onto said drum and there locked against rotation thereon, and having a plurality of said stationary jaws integral with and projecting radially from said hub section, said movable arrays comprising a plurality of axles pivotally carried by said first members and having thereon first radial tongues secured to and supporting said movable jaws thereon, and said control system for the movable arrays comprising second members each having a central hub section removably fitted and locked onto said drum adjacent said first member, and having thereon second radial tongues supporting control shafts for said movable jaws.

2. An apparatus as described in claim 1, wherein said first member are each formed as a single piece of plastics material.

3. An apparatus as described in claim 1, wherein said hub sections from which said stationary jaws extend feature slots adapted to couple removably with corresponding profiles secured to said drum.

4. An apparatus as described in claim 1, wherein said axles and said control shafts pass through bores made through, respectively, the hub sections of said first members, and said second radial tongues, the hub sections of each of said second members also featuring a crown with apertures through which said first tongues carrying the arrays of movable jaws emerge.

* * * * *